United States Patent
Malladi

(10) Patent No.: US 8,787,143 B2
(45) Date of Patent: Jul. 22, 2014

(54) METHOD AND APPARATUS FOR HYBRID FDM-CDM STRUCTURE FOR SINGLE CARRIER BASED CONTROL CHANNELS

(75) Inventor: Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 12/443,953

(22) PCT Filed: Oct. 29, 2007

(86) PCT No.: PCT/US2007/082881
§ 371 (c)(1),
(2), (4) Date: Apr. 1, 2009

(87) PCT Pub. No.: WO2008/057836
PCT Pub. Date: May 15, 2008

(65) Prior Publication Data
US 2010/0118855 A1 May 13, 2010

Related U.S. Application Data

(60) Provisional application No. 60/863,955, filed on Nov. 1, 2006.

(51) Int. Cl.
| | |
|---|---|
| *H04J 11/00* | (2006.01) |
| *H04J 1/00* | (2006.01) |
| *H04L 5/14* | (2006.01) |
| *H04B 7/216* | (2006.01) |
| *H04J 3/00* | (2006.01) |
| *H04B 7/208* | (2006.01) |
| *H04B 7/212* | (2006.01) |
| *H04J 3/16* | (2006.01) |
| *H04J 3/22* | (2006.01) |
| *H04J 13/00* | (2011.01) |
| *H04L 5/00* | (2006.01) |
| *H04L 5/06* | (2006.01) |
| *H04J 13/16* | (2011.01) |

(52) U.S. Cl.
CPC ............... *H04L 5/06* (2013.01); *H04J 27/2613* (2013.01); *H04J 13/0062* (2013.01); *H04L 5/0016* (2013.01); *H04L 5/0026* (2013.01); *H04L 5/0041* (2013.01); *H04J 13/16* (2013.01); *H04L 5/0051* (2013.01)
USPC ........... 370/208; 370/209; 370/210; 370/281; 370/295; 370/335; 370/337; 370/342; 370/344; 370/347; 370/465; 370/466

(58) Field of Classification Search
None
See application file for complete search history.

(56) References Cited

U.S. PATENT DOCUMENTS

| | | |
|---|---|---|
| 5,640,674 A | 6/1997 | Dixon |
| 7,177,297 B2 | 2/2007 | Agrawal et al. |

(Continued)

FOREIGN PATENT DOCUMENTS

| | | |
|---|---|---|
| CN | 1504058 A | 6/2004 |
| CN | 1633769 A | 6/2005 |

(Continued)

OTHER PUBLICATIONS

Myeongyun Cho et al: "A Novel Time Spreading Method for Down-Link OFDM-Code Division Multiplexing Systems" Vehicular Technology Conference. vol. 3, (Sep. 26, 2004), pp. 1845-1848, XP010786956.*

(Continued)

*Primary Examiner* — Faruk Hamza
*Assistant Examiner* — Diane Lo
(74) *Attorney, Agent, or Firm* — Peng Zhu

(57) ABSTRACT

A system and method for hybrid FDM (frequency division multiplexing)-CDM (code division multiplexing) structure for single carrier control channels is provided. The hybrid FDM-CDM structure maximizes frequency diversity over the entire available bandwidth such that orthogonality between signals from users in a given cell is maintained. Thus, users in the given cell can transmit over a non-contiguous set of tones. Furthermore, the hybrid FDM-CDM structure maintains orthogonality of a pilot of users in different cells based on a despreading operation in the time domain.

46 Claims, 14 Drawing Sheets

(56) References Cited

U.S. PATENT DOCUMENTS

| | | | |
|---|---|---|---|
| 2004/0071078 A1* | 4/2004 | Sudo | 370/208 |
| 2004/0221218 A1* | 11/2004 | Grob et al. | 714/748 |
| 2005/0250460 A1* | 11/2005 | Cleveland | 455/134 |
| 2006/0072649 A1* | 4/2006 | Chang et al. | 375/132 |
| 2006/0187887 A1 | 8/2006 | Kim et al. | |
| 2006/0245472 A1* | 11/2006 | Pan et al. | 375/144 |
| 2007/0036068 A1* | 2/2007 | Cho et al. | 370/208 |
| 2007/0041404 A1* | 2/2007 | Palanki et al. | 370/479 |
| 2007/0297386 A1* | 12/2007 | Zhang et al. | 370/344 |
| 2008/0080560 A1 | 4/2008 | Inoue et al. | |
| 2008/0123616 A1* | 5/2008 | Lee | 370/344 |

FOREIGN PATENT DOCUMENTS

| | | |
|---|---|---|
| JP | 2008028974 A | 2/2008 |
| JP | 2008092051 A | 4/2008 |
| KR | 20050097954 | 10/2005 |
| RU | 2213420 C2 | 9/2003 |
| RU | 2232483 C2 | 7/2004 |
| WO | 03019837 A1 | 3/2003 |
| WO | 2004075436 | 9/2004 |
| WO | 2005008930 | 1/2005 |
| WO | WO-2006102403 A2 | 9/2006 |
| WO | 2008041080 | 4/2008 |

OTHER PUBLICATIONS

International Search Report—PCT/US2007/082881, International Search Authority—European Patent Office, Apr. 7, 2008.

Written Opinion—PCT/US2007/082881, International Search Authority—European Patent Office, Apr. 7, 2008.

Branislav M Popovic: "Spreading Sequences for Multicarrier CDMA Systems" IEEE Transactions on Communications, vol. 47, No. 6, (Jun. 1, 1996), pp. 918-926, XP011009440.

Doo Hwan Lee: "OFDMA Uplink Ranging for IEEE 802.16E Using Modified Genurlized Chirp-Like Polyphase Sequences" The First IEEE and IFIP International Conferences in Central Asia on Bishkek, Kyrgyz Republic, (Sep. 26, 2005)-(Sep. 28, 2005), pp. 1-5, XP01089639.

Zhuang X et al: "Ranging Improvement for 802.16E OFDMA PHY" Internet Citation, [Online] (Jun. 25, 2004), XP002448805.

Mamoru Sawahashi et al., "Layer 1/Layer 2 Control Channel Structure in Single-Carrier FDMA Based Evolved UTRA Uplink," Technical Report of The Institute of Electronics, Information and Communication Engineers, Japan, Oct. 12, 2006, vol. 106, No. 305, pp. 137-142, RCS2006-156.

Mamoru Sawahashi et al., "VSF-OFCDM with Two-Dimensional Spreading Prioritizing Time Domain in Other-cell Interference Environment," Technical Report of The Institute of Electronics, Information and Communication Engineers, Japan, Jul. 12, 2002, vol. 102, No. 206, pp. 87-92, RCS2002-133.

NEC Group, NTT DoCoMo, Reference signal multiplexing for EUTRA uplink,3GPP TSG RAN WG1 LTE Adhoc R1-061886, Jun. 30, 2006.

NTT DoCoMo et.al, Multiplexing Method for Orthogonal Reference Signals for E-UTRA Uplink,3GPP TSG RAN WG1 Meeting #46 R1-062101, 3GPP, Sep. 1, 2006.

Motorola: "RACH Design for EUTRA", 3GPP TSG RAN1#43 R1-060025, Jan. 25, 2006.

NTT DoCoMo et al., "Data-non-associated L1/L2 Control Channel Structure for E-UTRA Uplink", 3GPP TSG RAN WG1 Meeting #46bis R1-062741, Oct. 13, 2006.

Ritt: "Performance of Transmit Antenna Switch for Random Access", 3GPP TSG RAN WG1 meeting #45 R1-061141, May 12, 2006.

Taiwan Search Report—TW096141265—TIPO—Dec. 13, 2011.

Nokia: "Multiplexing of L1/L2 Control Signalling when UE has no data to transmit," 3GPP TSG-RAN WG1#46b, R1-062841, Oct. 13, 2006.

* cited by examiner

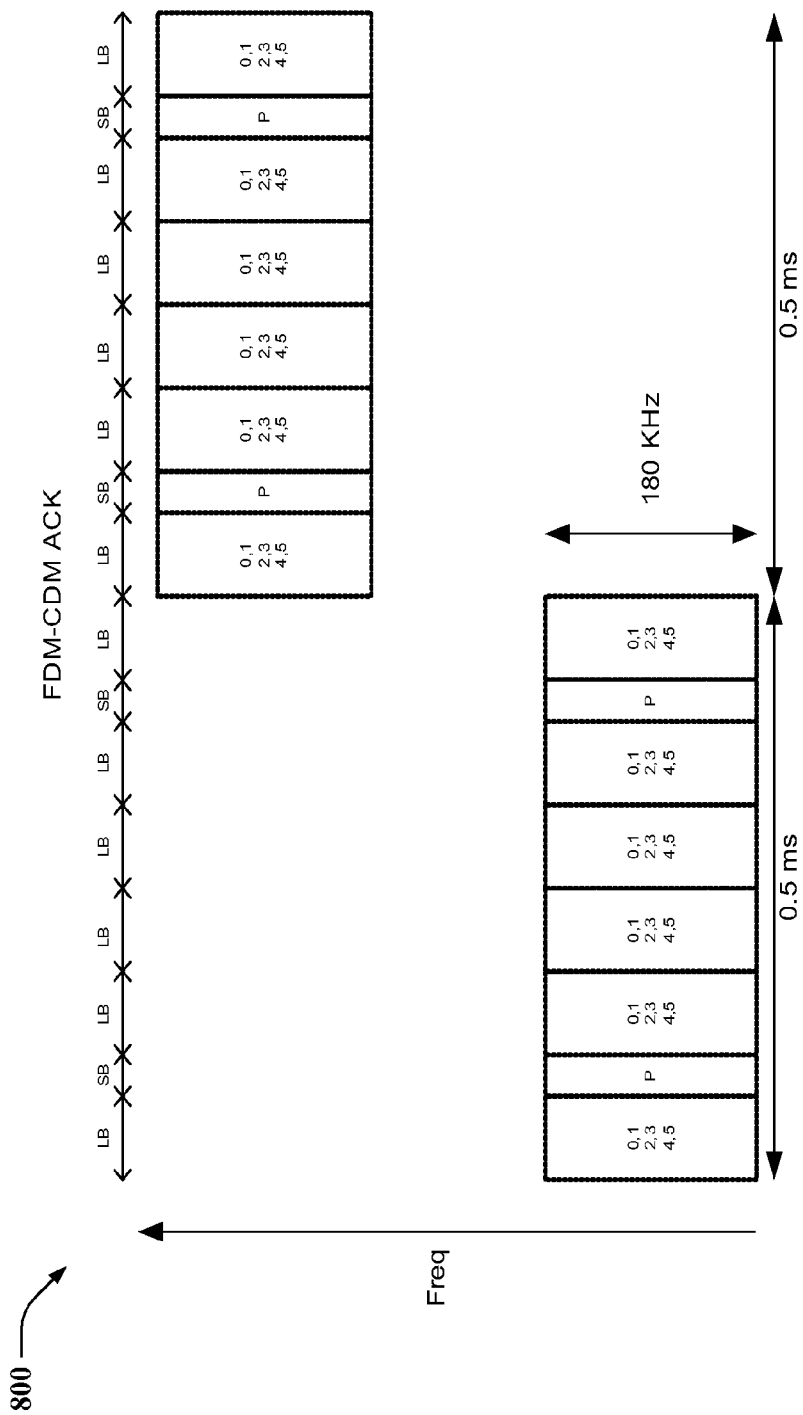

METHOD AND APPARATUS FOR HYBRID FDM-CDM STRUCTURE FOR SINGLE CARRIER BASED CONTROL CHANNELS

CROSS-REFERENCE TO RELATED APPLICATIONS

This application claims the benefit of priority under 35 U.S.C. Section 119 from U.S. Provisional Patent Application Ser. No. 60/863,955 entitled "A METHOD AND APPARATUS FOR HYBRID FDM-CDM STRUCTURE FOR SINGLE CARRIER BASED CONTROL CHANNELS", filed on Nov. 1, 2006, the entirety of which is incorporated hereby by reference.

BACKGROUND

I. Field

The following description relates generally to wireless communications, and more particularly to a hybrid FDM (frequency division multiplexing)-CDM (code division multiplexing) structure for single carrier based control channels that provides increased frequency diversity for a given user.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. Conventional techniques, however, do not allow users to transmit over non-contiguous tones and thus cannot provide a given user a maximum frequency diversity to employ the entire available bandwidth to transmit a signal.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect of the system, an apparatus operable in wireless communication system to maximize frequency diversity from a user's perspective is disclosed herein. The apparatus includes means for performing frequency division multiplexing (FDM) on signals from users in different groups and means for performing code division multiplexing (CDM) in frequency domain on signals from users in the same group. Furthermore, the apparatus includes means for performing code division multiplexing (CDM) in time domain on signals from users in the same group.

Another aspect of the specification relates to a method that maximizes frequency diversity for a given user for transmitting single carrier control signals in the available bandwidth. The method includes frequency division multiplexing (FDM) signals from users in different groups, code division multiplexing (CDM) in frequency domain signals from users in the same group and code division multiplexing (CDM) in time domain signals from users in the same group. Thus, the transmitted signal has a hybrid FDM-CDM structure.

An aspect of the specification discloses an apparatus operable in wireless communication system that maximizes frequency diversity from a user's perspective. The apparatus comprises a hybrid FDM-CDM receiving component that identifies a received signal from the user in the given cell, wherein the received signal employs a hybrid FDM-CDM scheme. The received signal is demodulated and despread in time and frequency domain at the receiving end to determine a transmitted signal.

According to another aspect of the specification, a method that facilitates retrieval of a single carrier control signal is disclosed. The method includes receiving an incoming signal that supports a hybrid FDM-CDM (frequency division multiplexing-code division multiplexing) structure. The received signal is demodulated by employing most any demodulation technique. The method further includes despreading the received signal in time domain and despreading the received signal in frequency domain to obtain a signal transmitted by a specific user in a given cell.

Another aspect of the specification teaches a wireless communications apparatus that facilitates recovery of a control signal transmitted by a user. The wireless communications apparatus comprises means for receiving an incoming signal that supports a hybrid FDM-CDM (frequency division multiplexing-code division multiplexing) structure. Furthermore, the wireless communications apparatus comprises means for demodulating the received signal and means for despreading the received signal in time domain and frequency domain to determine a signal transmitted by a particular user from a particular cell.

According to one aspect of the specification, a method for receiving a single carrier control signals that employ a hybrid FDM-CDM (frequency division multiplexing-code division multiplexing) structure is disclosed that includes identifying a set of signals from users in at least one cell based in part on demodulation of a received signal and identifying at least one signal associated with a specific user in the at least one cell based in part on a despreading operation performed on the set of signals in time and frequency domain. The hybrid FDM-CDM structure maximizes frequency diversity from a specific user's perspective.

Yet another aspect of the specification relates to a wireless communications apparatus, comprising a memory that retains instructions related to transmitting a single carrier control channel that employs a hybrid FDM-CDM structure. The wireless communications apparatus also includes a processor coupled to the memory, configured to execute the instructions retained in the memory.

A wireless communication system that maximizes frequency diversity from a user's perspective is provided, in accordance with an aspect of the subject specification. The system includes a processor configured to divide a control channel into one or more groups that are frequency division multiplexed (FDM) with each other and perform code division multiplexing (CDM) on control channel signals from users within each of the one or more groups in time and frequency domain.

According to yet another aspect of the specification a wireless communications apparatus is disclosed that comprises a memory that retains instructions related to receiving a single carrier control channel that employs a hybrid FDM-CDM structure and a processor coupled to the memory, configured to execute the instructions retained in the memory.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

FIG. 8 is an illustration of an example hybrid FDM-CDM that facilitates an increase in frequency diversity from a given user's perspective, according to an aspect of the system

DETAILED DESCRIPTION

Figure 1:
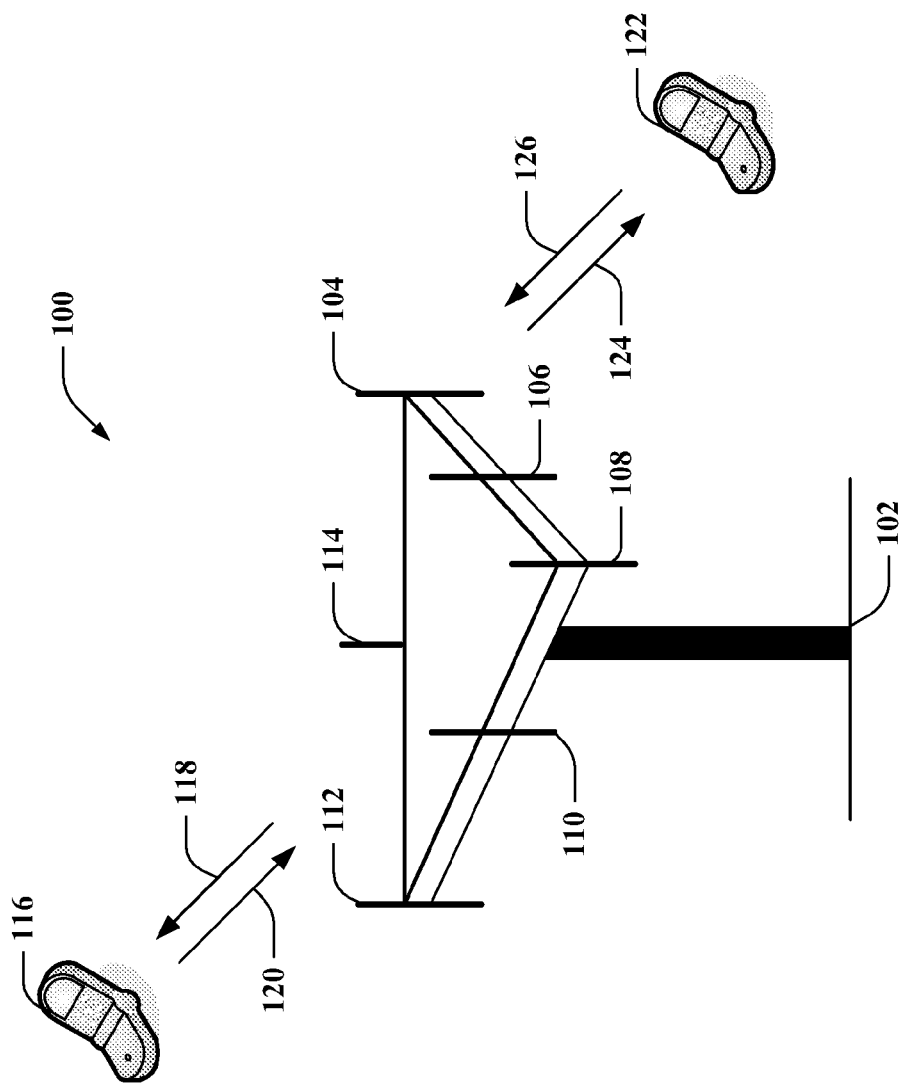
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, the terms "reference signal," "pilot" and the like are used interchangeably in this application and are intended to refer to a signal transmitted over a communications system for supervisory, control, equalization, continuity, synchronization, reference purposes and the like.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 may utilize a different frequency band than that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

The set of antennas and/or the area in which they are designated to communicate may be referred to as a sector of base station 102. For example, multiple antennas may be designed to communicate to mobile devices in a sector of the areas covered by base station 102. In communication over forward links 118 and 124, the transmitting antennas of base station 102 may utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices.

Figure 2:
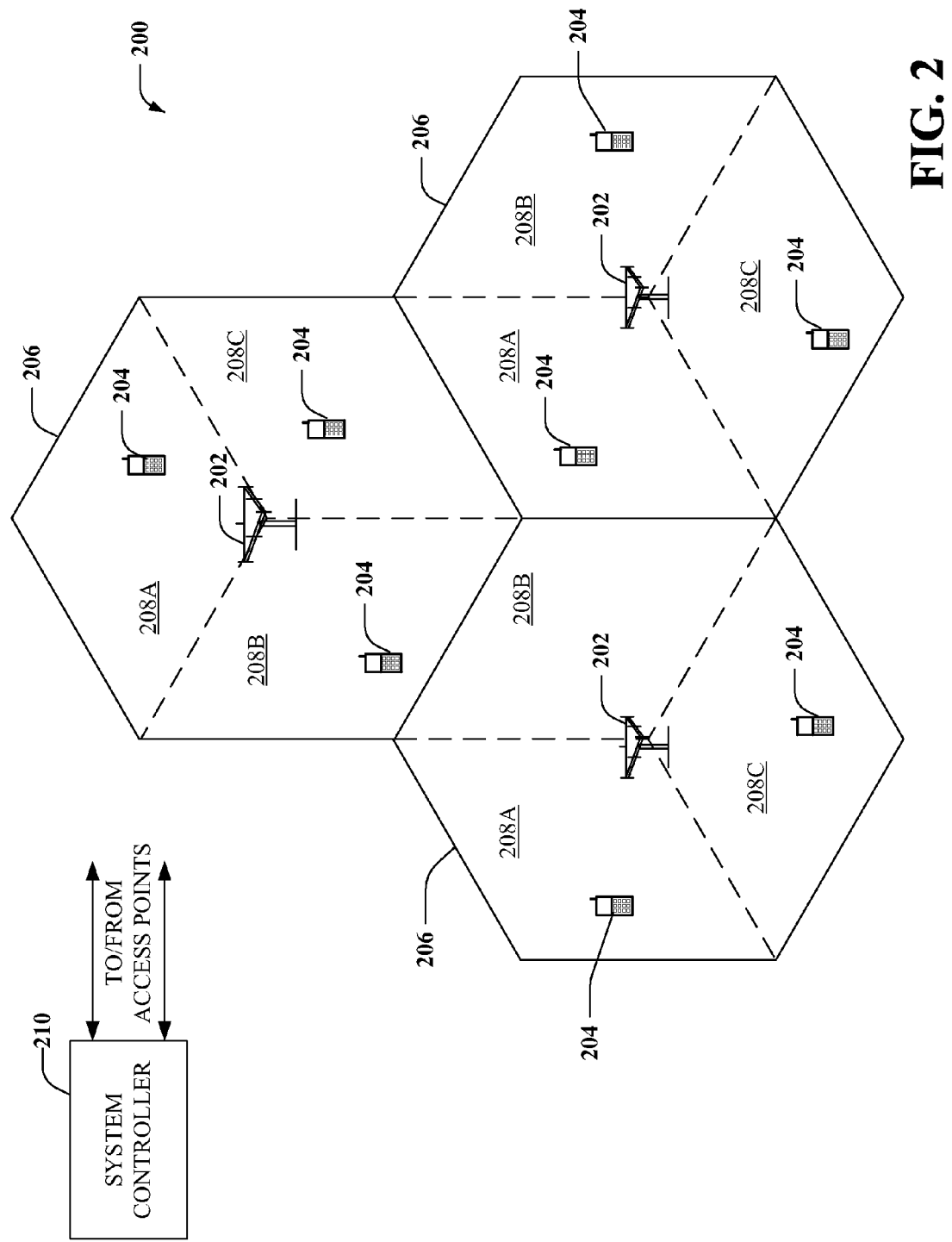
FIG. 2 is an illustration of a wireless communication system with multiple base stations and multiple terminals, such as may be utilized in conjunction with one or more aspects.

Referring now to FIG. 2, a wireless communication system 200 in accordance with various aspects presented herein is illustrated. System 200 can comprise one or more access points 202 that receive, transmit, repeat, etc., wireless communication signals to each other and/or to one or more terminals 204. Each base station 202 can comprise multiple transmitter chains and receiver chains, e.g., one for each transmit and receive antenna, each of which can in turn comprise a plurality of components associated with signal transmission and reception (e.g., processors, modulators, multiplexers, demodulators, demultiplexers, antennas, etc.). Terminals 204 can be, for example, cellular phones, smart phones, laptops, handheld communication devices, handheld computing devices, satellite radios, global positioning systems, PDAs, and/or any other suitable device for communicating over wireless system 200. In addition, each terminal 204 can comprise one or more transmitter chains and a receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

As illustrated in FIG. 2, each access point provides communication coverage for a particular geographic area 206. The term "cell" can refer to an access point and/or its coverage area, depending on context. To improve system capacity, an access point coverage area can be partitioned into multiple smaller areas (e.g., three smaller areas 208A, 208B and 208C). Each smaller area is served by a respective base transceiver subsystem (BTS). The term "sector" can refer to a BTS and/or its coverage area depending upon context. For a sectorized cell, the base transceiver subsystem for all sectors of the cell is typically co-located within the access point for the cell.

Terminals 204 are typically dispersed throughout system 200. Each terminal 204 may be fixed or mobile. Each terminal 204 may communicate with one or more access points 202 on the forward and reverse links at any given moment.

For a centralized architecture, a system controller 210 couples access points 202 and provides coordination and control of access points 202. For a distributed architecture, access points 202 may communicate with one another as needed. Communication between access points via system controller 210 or the like can be referred to as backhaul signaling.

The techniques described herein may be used for a system 200 with sectorized cells as well as a system with un-sectorized cells. For clarity, the following description is for a system with sectorized cells. The term "access point" is used generically for a fixed station that serves a sector as well as a fixed station that serves a cell. The terms "terminal" and "user" are used interchangeably, and the terms "sector" and "access point" are also used interchangeably. A serving access point/sector is an access point/sector with which a terminal communicates. A neighbor access point/sector is an access point/sector with which a terminal is not in communication.

Figure 3:
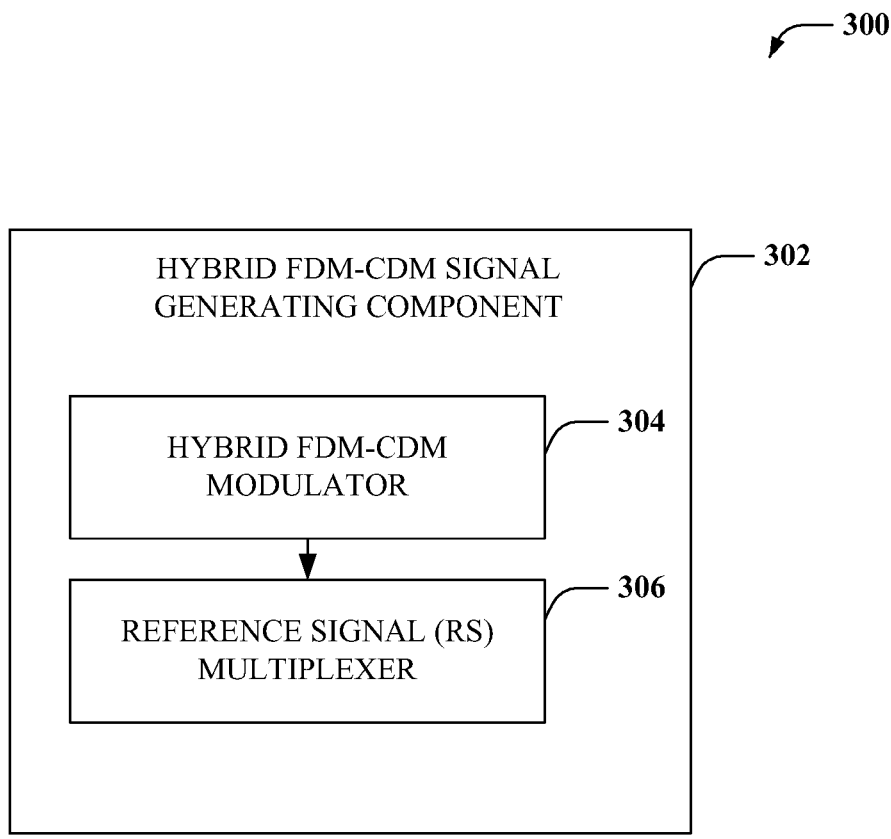
FIG. 3 is an illustration of an example system that transmits a signal with a hybrid FDM-CDM (frequency division multiplexing-code division multiplexing) structure, according to an aspect of the system.

Referring to FIG. 3, there illustrated is an example system 300 that generates a hybrid FDM-CDM structure for a signal that is to be transmitted. Generally, system 300 can be part of most any communication system (not shown), e.g., an LTE (Long Term Evolution) system. LTE systems can generally focus toward, but are not limited to, improving efficiency, lowering costs, improving services, making use of new spectrum opportunities, and better integration with other open standards etc. Typically, LTE systems can employ OFDMA (Orthogonal Frequency Division Multiple Access) for the downlink (tower to mobile device) and a Single Carrier wave for the uplink (mobile device to tower). Furthermore, the system can employ MIMO (Multiple-input and multiple-output), with two or more antennas per station.

Typically, OFDM modulation achieves multiple access by assigning subsets of subcarriers to individual users. Thus, each user can be allocated a specific set of tones to transmit a signal to a base station. Furthermore, during the uplink (reverse link), conventional systems employ a single carrier modulation technique that does not permit a user to transmit on different non-contiguous tones. FDM (frequency division multiplexing) can be employed by conventional systems to transmit logical channels.

In an aspect, logical channels can be classified into control channels and traffic channels. Typically, logical control channels can comprise a Broadcast Control Channel (BCCH) which is a DL (Down Link) channel for broadcasting system control information, a Paging Control Channel (PCCH) which is a DL channel that transfers paging information, and/or a Multicast Control Channel (MCCH) which is a point-to-multipoint DL channel used for transmitting multimedia broadcast and multicast service (MBMS) scheduling and control information for one or several MTCHs. Generally, after establishing a RRC (Radio Resource Control) connection this channel can only be employed by UEs (User Equipment) that receive MBMS (Note: old MCCH+MSCH). Furthermore, a Dedicated Control Channel (DCCH) is a point-to-point bi-directional channel that transmits dedicated control information and is employed by UEs having an RRC connection. In aspect, logical traffic channels comprise a Dedicated Traffic Channel (DTCH), which is point-to-point bi-directional channel, dedicated to one UE, for the transfer of user information, and, a Multicast Traffic Channel (MTCH) that point-to-multipoint DL channel for transmitting traffic data.

In an aspect, transport channels can be typically classified into DL (Down Link) and UL (Up Link) channels. DL transport channels can comprise a Broadcast Channel (BCH), Downlink Shared Data Channel (DL-SDCH) and a Paging Channel (PCH), the PCH that can support of UE power saving (DRX cycle is indicated by the network to the UE), broadcasted over entire cell and mapped to PHY resources which can be used for other control/traffic channels. The UL transport channels can comprise a Random Access Channel (RACH), a Request Channel (REQCH), an Uplink Shared Data Channel (UL-SDCH) and one or more PHY channels. The PHY channels can comprise a set of DL channels and UL channels, such as, but not limited to, a Common Pilot Channel (CPICH), a Synchronization Channel (SCH), a Common Control Channel (CCCH), a Shared DL Control Channel (SDCCH), a Multicast Control Channel (MCCH), a Shared UL Assignment Channel (SUACH), an Acknowledgement Channel (ACKCH), a DL Physical Shared Data Channel (DL-PSDCH), an UL Power Control Channel (UPCCH), a Paging Indicator Channel (PICH), a Load Indicator Channel (LICH), a Physical Random Access Channel (PRACH), a Channel Quality Indicator Channel (CQICH), an Acknowledgement Channel (ACKCH), an Antenna Subset Indicator Channel (ASICH), a Shared Request Channel (SREQCH), an UL Physical Shared Data Channel (UL-PSDCH), a Broadband Pilot Channel (BPICH), etc.

Typically, a channel structure is provided that preserves low PAR (such that at any given time, the channel is contiguous or uniformly spaced in frequency) properties of a single carrier waveform. However, the structure provided by conventional systems does not permit a user to transmit over non-contiguous channels.

Referring back to FIG. 3, the system 300 can include a hybrid FDM-CDM generating component 302 that can be employed to achieve maximum frequency diversity for a user over a given bandwidth such that the user can transmit a signal over different non-contiguous tones. The hybrid FDM-CDM generating component 302 can include a hybrid FDM-CDM modulator 304 that can receive a signal to be transmitted (e.g. control signal) and modulate the signal employing a hybrid FDM-CDM technique. The hybrid FDM-CDM technique can be a combination of FDM and FD-CDM (frequency domain code division multiplexing).

The hybrid FDM-CDM technique can provide increased frequency diversity to users in a given cell, such that, each user can transmit over the entire available bandwidth. The hybrid FDM-CDM modulator 304 can employ cyclic shifts of most any spreading sequence, e.g., Zadoff-Chu (ZC) sequence to achieve multiple access communication. Furthermore, frequency hopping techniques can be employed to achieve greater frequency diversity and utilize the available bandwidth more efficiently.

The modulated signal can then be sent to a Reference signal (RS) multiplexer 306 that can be employed to further multiplex the signal. The RS multiplexer 306 can employ time-domain CDM such that users in different cells can be identified at a receiver. Thus, users in neighboring cells can utilize the same bandwidth and the same ZC sequence for FD-CDM. A spreading operation can be performed by the RS multiplexer 304 by employing most any spreading code in time domain. As an example, a sequence can be multiplied by a unique Hadamard code in time domain. It can be appreciated that the RS multiplexer 306 can employ most any orthogonal code. Thus, users across different cells can occupy the same bandwidth and can use the same set of sequences to transmit a signal if different orthogonal codes are employed across the different cells. The RS multiplexer 306 ensures that pilots of users in different cells that use the same sequence for modulation do not interfere. Typically, the multiplexed signal can be transmitted to a receiver or a base station (not shown) via an antenna. The multiplexed signal can be processed at the receiver to determine the original signal.

Figure 4:
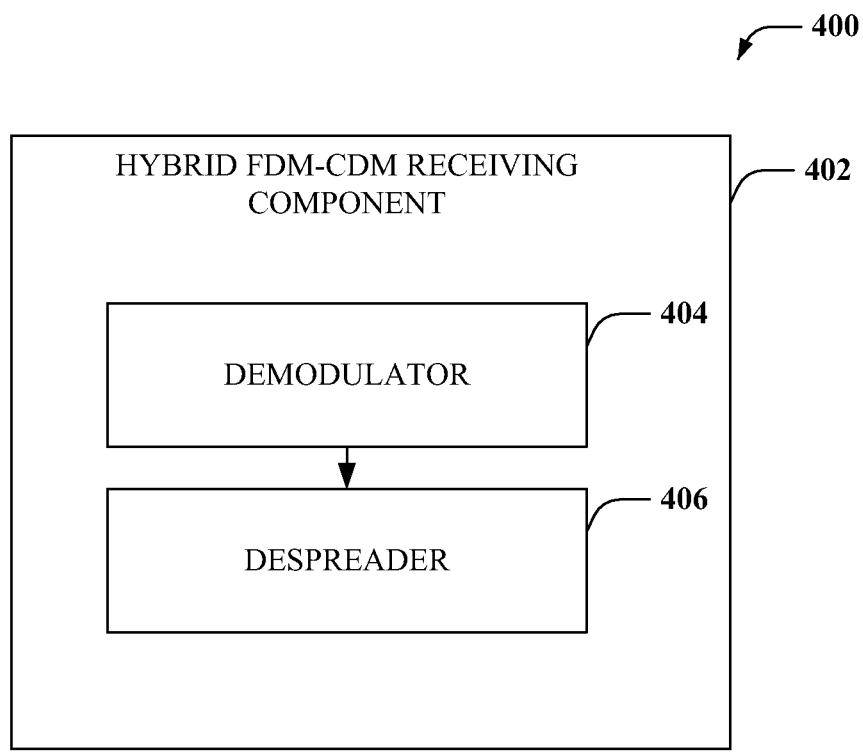
FIG. 4 is an illustration of an example system that receives a signal with a hybrid FDM-CDM structure in accordance with an aspect of the system.

Referring now to FIG. 4, there illustrated is a system 400 that can be employed to retrieve a received signal, according to an aspect of the invention. System 400 generally includes a hybrid FDM-CDM receiving component 402 that can receive an incoming signal via one or more antennas (not shown). The hybrid FDM-CDM receiving component 402 can be part of most any communications system (e.g. a MIMO system) at the receiver end, such as a base station or a mobile device.

The received signal is demodulated by the demodulator 404 to separate out groups of users from each cell. It can be appreciated that most any demodulation technique can be employed to identify different groups. As an example, a FFT (Fast Fourier Transform) can be employed for frequency demodulation by the demodulator 404. Furthermore, if a frequency hopping scheme has been utilized at the transmitter, the demodulator 404 can employ the inverse hopping sequence to detect the signal at the receiving end. Thus, the demodulator 404 can separate out signals from a set of users in different cells.

The demodulated signal can now be employed to separate out signals from each user in each cell by performing a despreading operation on each set of users identified by the demodulator 404, which can be carried out by the despreader 406. The despreader 406 can perform a despreading operation on the demodulated signal in time and frequency domain to recover a signal transmitted by a specific user in a specific cell. The despreader 406 can employ one or more despreading filters to identify a signal from a specific user from the group of users in a cell. Typically, the despreading filters can employ a despreading code that is the inverse of the spreading code employed by the user during transmission.

Figure 5:
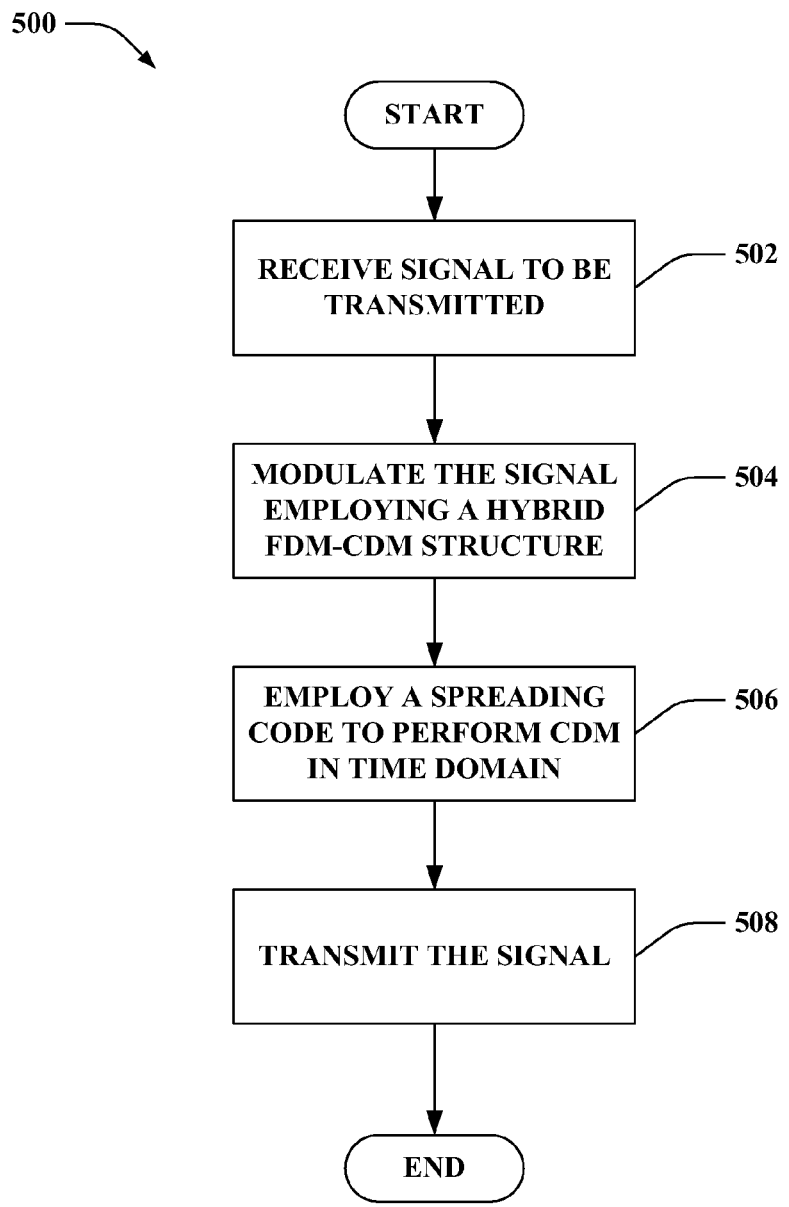
FIG. 5 is an illustration of an example methodology that facilitates transmission of a signal employing a hybrid FDM-CDM structure, according to an aspect of the specification.

FIG. 5 illustrates a methodology 500 to transmit a signal employing a hybrid FDM-CDM structure, in accordance with an aspect of the specification. While, for purposes of simplicity of explanation, the one or more methodologies shown herein, e.g., in the form of a flow chart, are shown and described as a series of acts, it is to be understood and appreciated that the subject specification is not limited by the order of acts, as some acts may, in accordance with the specification, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the specification.

Referring back to FIG. 5, the signal to be transmitted can be received at 502. The received signal can then be modulated employing a hybrid FDM-CDM structure at 504. Modulation can allow each user to occupy the entire bandwidth available. As an example, Chu-multiplexing can be employed to modulate the received signal such that each user in a given cell can occupy non-contiguous set of tones. However, it can be appreciated that most any sequence can be employed for multiplexing in the frequency domain. Furthermore, the signal can be frequency hopped to achieve increased frequency diversity.

The FDM-CDM signal is further multiplexed in the time domain at 506. A spreading code is employed to perform code division multiplexing in the time domain. As an example, a Hadamard sequence of length 4 can be multiplied to the FDM-CDM signal. However, most any orthogonal sequence of any length can be employed for multiplexing. CDM in time domain maintains orthogonality of the pilot of users in different (neighboring) cells and can be employed to create multiple reference signals across cells.

Figure 6:
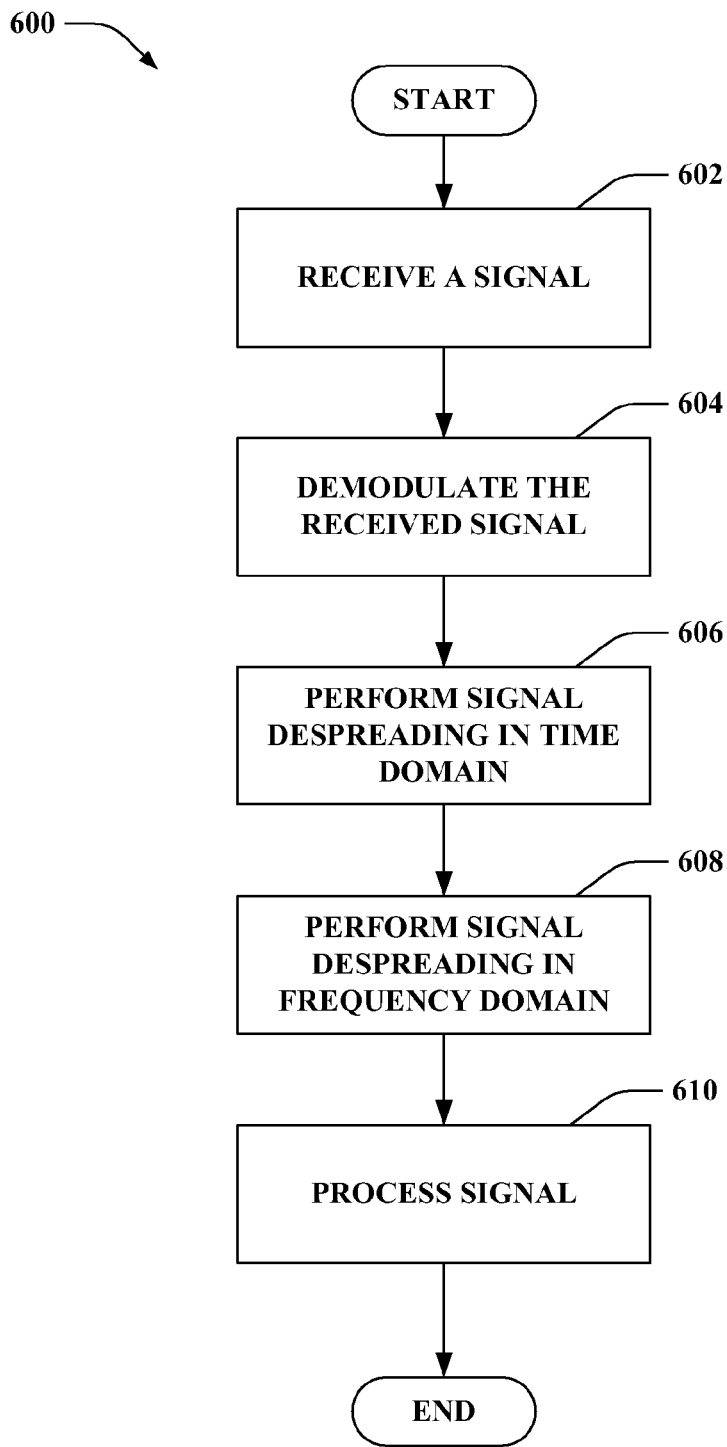
FIG. 6 is an illustration of an example methodology that facilitates recovery of a signal transmitted by a user employing a hybrid FDM-CDM structure in a wireless communication system.

Referring now to FIG. 6 that illustrates a methodology 600 that recovers a signal transmitted by a user employing a hybrid FDM-CDM structure. An incoming signal is received at 602. The signal can be received by one or more antenna and then demodulated at 604 to separate out signals transmitted by groups of users from different cells that use the same bandwidth. The demodulation can be performed by most any frequency demodulation technique, such as, but not limited to, an FFT. Thus, frequency demodulation can be employed to identify signals from a set of users from a given cell.

The signal from each user in the given cell can be separated out by performing signal despreading in the time and frequency domain. A despreading operation in the time domain can be performed on the demodulated signal at 606. Furthermore, a despreading operation in the frequency domain can be performed on the demodulated signal at 608. Most any despreading filtering technique can be employed to filter out a signal from a particular user in a given cell. The filtering technique can employ a despreading code that is an inverse of the spreading code employed by the particular user during transmission. Thus, a signal from a particular user in a particular cell can be identified and each signal can be further processed at 610.

Figure 7A:
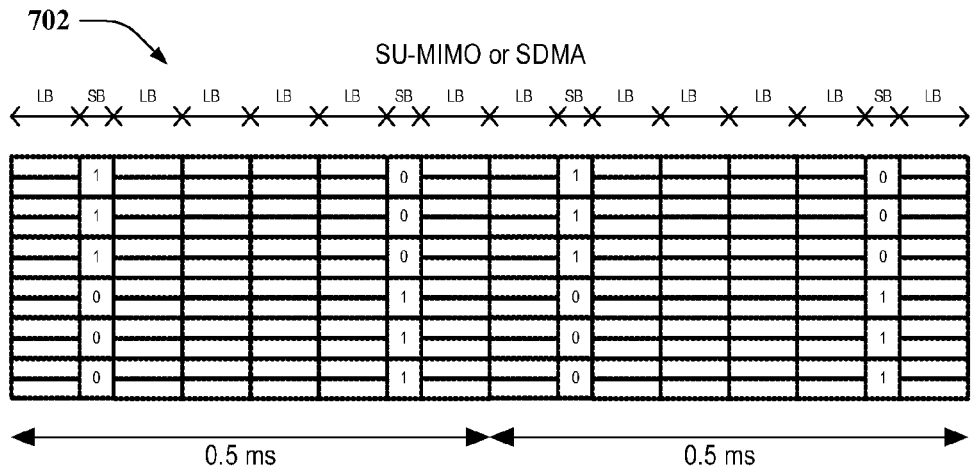
FIGS. 7A-B illustrate example graphs that depict the frequency at which a user can transmit single carrier control channels by employing conventional systems.
Figure 7B:
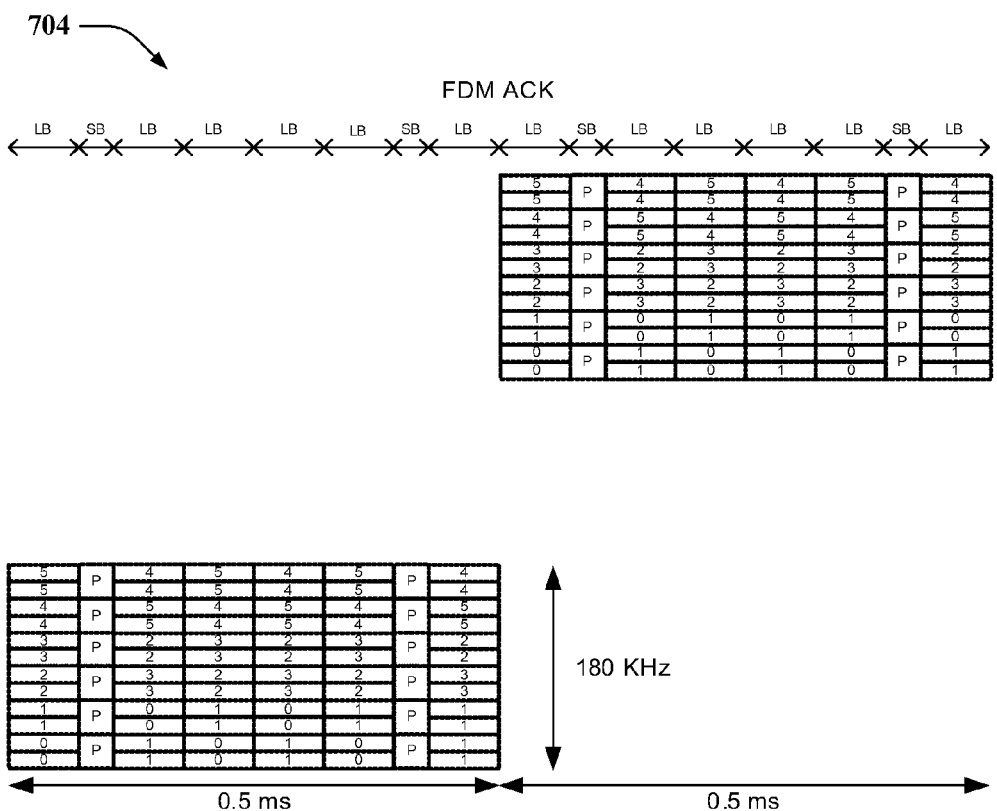

FIGS. 7A-7B illustrate example graphs that depict a frequency at which a user can transmit single carrier control channels employing conventional systems. FIG. 7A depicts a SU-MIMO (single user multiple input multiple output) or SDMA (space division multiple access) structure wherein two users can transmit signals over contiguous tones. An FDM RS (reference signal) structure 702 can be employed for intra-cell transmission. Typically, communication systems transmit reference signals to serve several receiver and system purposes including, but not limited to, channel medium estimation for coherent demodulation of the data signal at the receiver and channel quality estimation for transmission scheduling purposes.

As seen from FIG. 7A, two streams (0 and 1) can occupy the same bandwidth. These streams can be from the same UE (SU-MIMO) or different UEs (SDMA). The RS for both streams can be orthogonally transmitted using FDM. Furthermore, it can be observed that all the 0's and 1's are transmitted together in contiguous tones. Initially, stream 0 occupies the lower half of the bandwidth while stream 1 occupies the upper half. During the next transmission, stream 1 occupies the lower half of the bandwidth while stream 0 occupies the upper half. However, it can be noted that the two streams cannot be interleaved with each other in the spectrum. Thus, conventional systems do not permit streams to transmit on non-contiguous tones.

Referring now to FIG. 7B, illustrates a conventional FDM multiplexing structure 704 with six streams (0, 1, 2, 3, 4 and 5) that occupy a given bandwidth (e.g. 180 KHz). Each stream represents a signal from a user in a given cell. Generally, users from the given cell can employ the structure 704 to transmit a control signal (e.g. ACK, CQI, etc.). The users can occupy different parts of the spectrum that have been allocated to them, as shown. Thus, no other user can occupy the spectrum utilized by a particular user. As an example, user 3 cannot occupy the part of the spectrum occupied by user 0. Furthermore, a frequency hopping scheme can be employed to increase the frequency diversity for a given user. For example, user 0 occupies the lowest frequency in the first two symbols but hops to a higher frequency in the third symbol. However, regardless of the hopping scheme, conventional systems do not permit one set of tones to be occupied by more than one user, thus limiting frequency diversity. Additionally, as seen in the conventional structure 704, a user can occupy only two tones in the entire bandwidth that is available. For example, user 0 can occupy only 60 KHz of the total 180 KHz available bandwidth, even after implementing a frequency hopping scheme.

FIG. 8 illustrates an example hybrid FDM-CDM structure 800 to further increase frequency diversity from a given user's perspective, according to an aspect of the specification. As seen, each user can occupy the entire available bandwidth and thus frequency diversity can be maximized. As an example, each user 0-5 can transmit over the entire bandwidth of 180 KHz. Thus, users can transmit over non-contiguous tones and achieve maximum frequency diversity. The hybrid FDM-CDM structure can be generated by multiplexing, as described supra. For example, a Chu sequence can be employed as a frequency domain spreading code during multiplexing. This hybrid FDM-CDM structure 800 can be employed to transmit from multiple users in a given cell.

Figure 9:
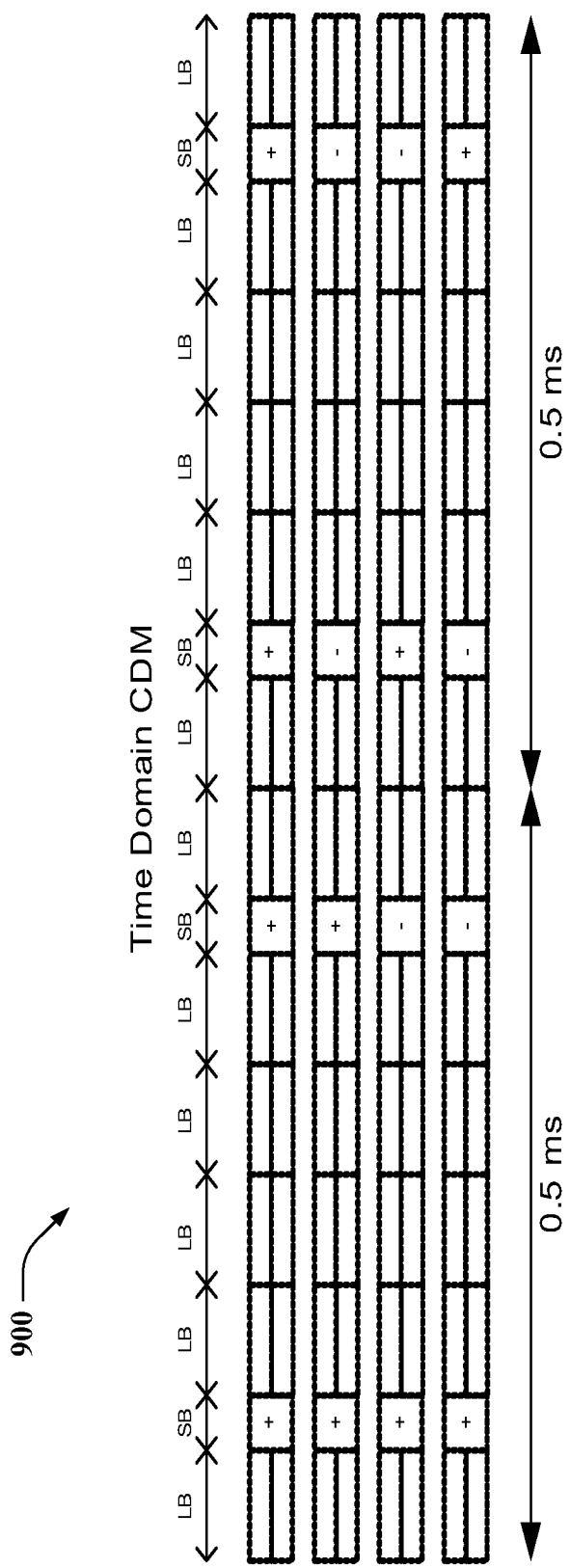
FIG. 9 is an illustration of an example time domain CDM structure that can maintain orthogonality between pilots during inter cell transmissions in accordance with an aspect of the subject specification.

Referring now to FIG. 9, there illustrated is an example time domain CDM structure 900 that can maintain orthogonality between pilots during inter cell transmissions. As an example, a length 4 Hadamard sequence is employed in structure 900. However, it can be appreciated that most any orthogonal sequence of most any length can be employed. The [+] and [−] symbols illustrated, represent orthogonal covers. The sequences [+][+][+][+], [+][+][−][−], [+][−][+][−], and, [+][−][−][+] are orthogonal to each other in time. A user from a given cell can employ this orthogonal spreading code in time domain, as seen from the figure, to avoid interference with a pilot of another user from a neighboring cell, along with the sequence in frequency domain (as seen from the structure 800 in FIG. 8).

A given cell can be allocated one of the four Hadamard sequences illustrated in FIG. 9. Users in a given cell can employ a particular Hadamard sequence such that users in neighboring cells employ different orthogonal sequences. Thus, at the receiver end, signals transmitted by users from different cells can easily be identified, even though the users employ the same spreading code in frequency domain. A despreading operation can be performed at the receiver in time domain to separate out users from neighboring cells that employ the same spreading code in the frequency domain.

As another example, a length 2 Hadamard sequence can be employed for time domain CDM. This sequence can provide a symmetric structure with downlink and simplify the implementation with reuse of blocks across uplink and downlink. Furthermore, increased number of Chu sequences can be available as RS, especially for smaller bandwidth allocation.

The structures 800 (from FIGS. 8) and 900 (from FIG. 9) achieve the maximum frequency diversity over the entire bandwidth while retaining orthogonality between users in a given cell. Furthermore, they maintain orthogonality of the pilot based on a despreading operation between cells.

Figure 10:
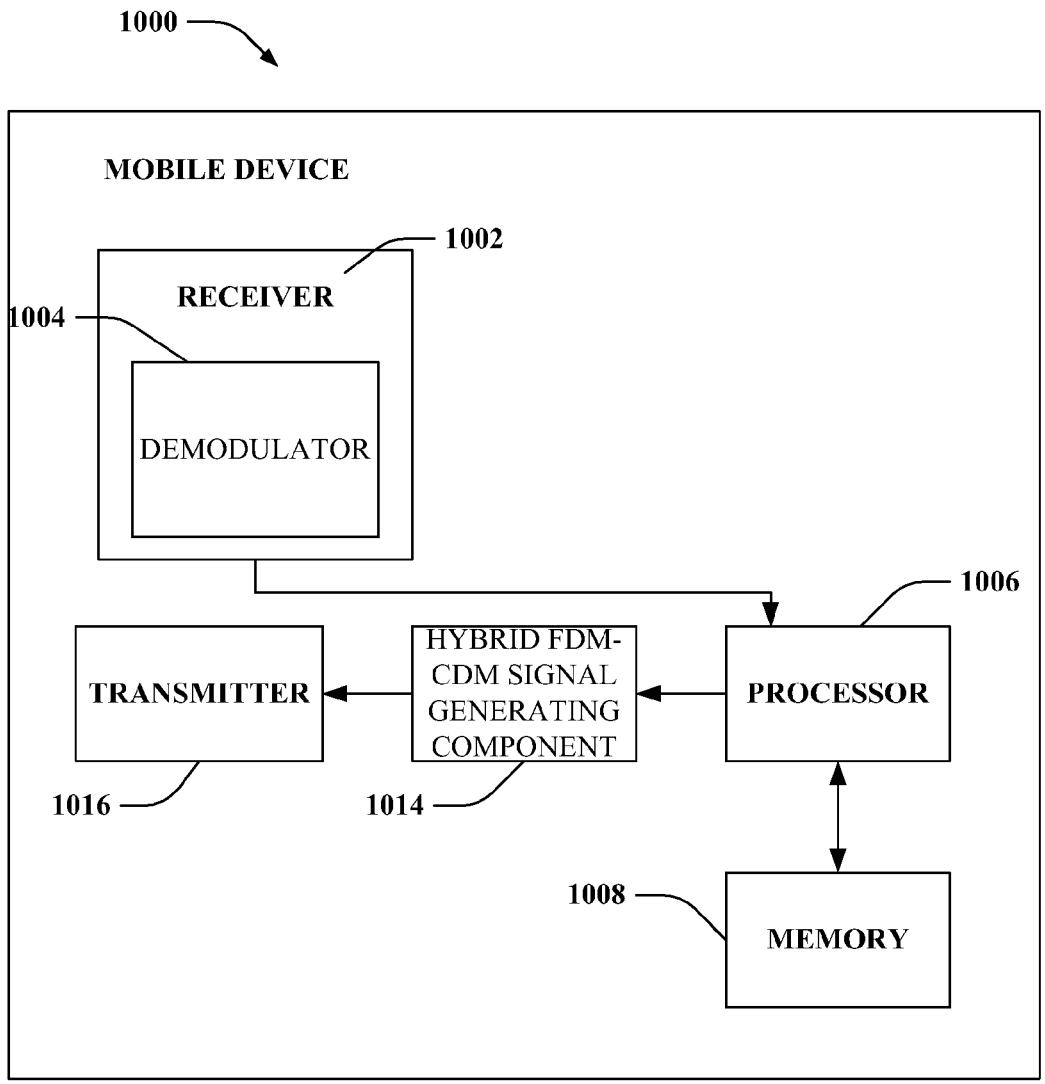
FIG. 10 is an illustration of an example mobile device that employs a hybrid FDM-CDM structure to transmit a signal, in accordance with an aspect of the subject disclosure.

FIG. 10 is an illustration of an example mobile device 1000 that employs a hybrid FDM-CDM structure to transmit a signal, in accordance with an aspect of the system. Mobile device 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Typically, an OFDMA signal is received on the downlink. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1016, a processor that controls one or more components of mobile device 1000, and/or a processor that both analyzes information received by receiver 1002, generates information for transmission by transmitter 1016, and controls one or more components of mobile device 1000.

Mobile device 1000 can additionally comprise memory 1008 that is operatively coupled to processor 1006 and that may store data to be transmitted, received data, information related to available channels, data associated with analyzed signal and/or interference strength, information related to an assigned channel, power, rate, or the like, and any other suitable information for estimating a channel and communicating via the channel. Memory 1008 can additionally store protocols and/or algorithms associated with estimating and/or utilizing a channel (e.g., performance based, capacity based, etc.).

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Mobile device 1000 still further comprises a hybrid FDM-CDM signal generating component 1014 and a transmitter 1016 that transmits a signal (e.g., base CQI and differential CQI) to, for instance, a base station, another mobile device, etc. Although depicted as being separate from the processor 1006, it is to be appreciated that semi-connected controller 1010 and/or hybrid FDM-CDM signal generating component 1014 may be part of processor 1006 or a number of processors (not shown). The hybrid FDM-CDM signal generating component 1014 can be employed to multiplex the signal to be transmitted in the frequency as well as time domain. The hybrid FDM-CDM signal generating component 1014 multiplexes the signal to maximize frequency diversity such that multiple users can transmit on non-contiguous tones.

Figure 11:
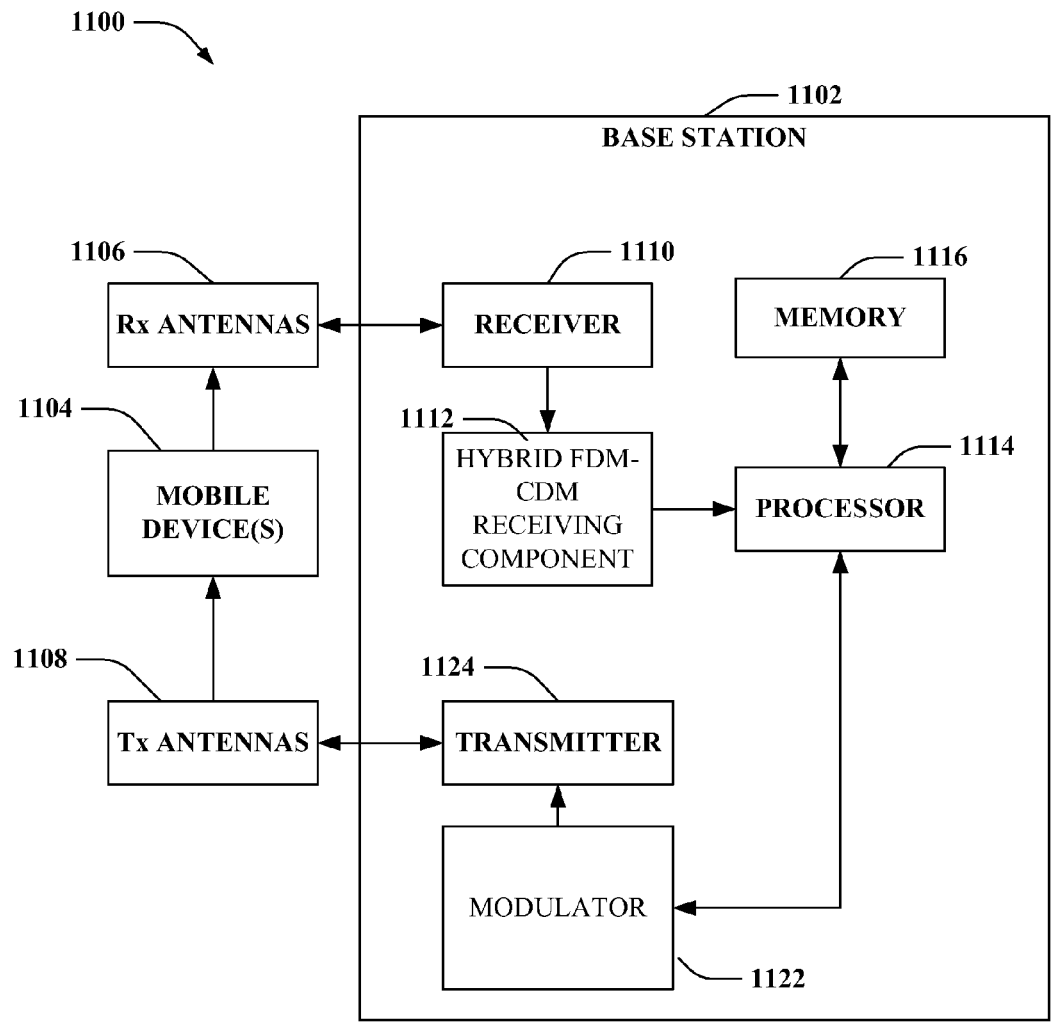
FIG. 11 is an illustration of an example system that facilitates recovery of a signal that employs a hybrid FDM-CDM structure, according to an aspect of the system.

FIG. 11 is an illustration of an example system 1100 that facilitates recovering a signal that employs a hybrid FDM-CDM structure, according to an aspect of the system. System 1100 comprises a base station 1102 (e.g., access point, . . . ) with a receiver 1110 that receives signal(s) from one or more mobile devices 1104 through a plurality of receive antennas 1106, and a transmitter 1124 that transmits to the one or more mobile devices 1104 through a plurality of transmit antennas 1108. Receiver 1110 can receive information from receive antennas 1106 and is operatively associated with a hybrid FDM-CDM receiving component 1112 that demodulates and despreads received information. The hybrid FDM-CDM receiving component 1112 can separate signals from a group of users from different cells and can then separate out individual users within each group by employing despreading filters in time domain as well as frequency domain. The despreading filters employ a code that is the inverse of the spreading code employed at the mobile device(s) 1104. Demodulated symbols are analyzed by a processor 1114 that can be similar to the processor described above with regard to FIG. 10, and which is coupled to a memory 1116 that stores information related to estimating a signal (e.g., pilot) strength and/or interference strength, data to be transmitted to or received from mobile device(s) 1104 (or a disparate base station (not shown)), and/or any other suitable information related to performing the various actions and functions set forth herein.

Information to be transmitted may be provided to a modulator 1122. Modulator 1122 can multiplex the information for transmission by a transmitter 1126 through antenna 1108 to mobile device(s) 1104. Typically, OFDMA can be employed for the downlink transmission. Although depicted as being separate from the processor 1114, it is to be appreciated that semi-connected controller 1118 and/or modulator 1122 may be part of processor 1114 or a number of processors (not shown).

Figure 12:
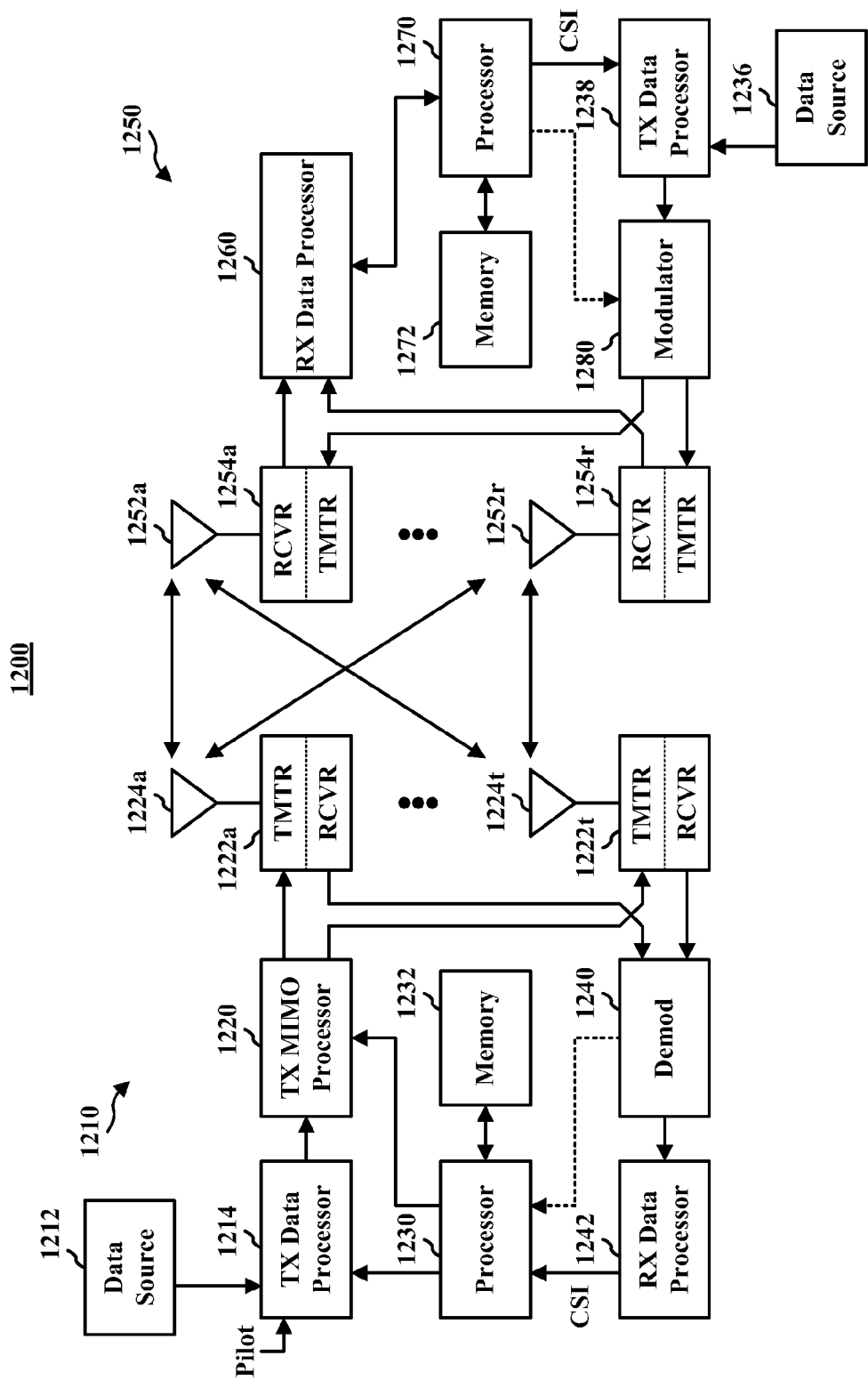
FIG. 12 is an illustration of an example wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 may include more than one base station and/or more than one mobile device, wherein additional base stations and/or mobile devices may be substantially similar or different from example base station 1210 and mobile device 1250 described below. In addition, it is to be appreciated that base station 1210 and/or mobile device 1250 may employ the systems (FIGS. 3-4 and 10-11) and/or methods (FIGS. 5-6) described herein to facilitate wireless communication there between.

At base station 1210, traffic data for a number of data streams is provided from a data source 1212 to a transmit (TX) data processor 1214. According to an example, each data stream may be transmitted over a respective antenna. TX data processor 1214 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 1250 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 1230.

The modulation symbols for the data streams may be provided to a TX MIMO processor 1220, which may further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 may receive and process the $N_R$ received symbol streams from $N_R$ receivers 1254 based on a particular receiver processing technique to provide $N_T$ "detected" symbol streams. RX data processor 1260 may demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 may periodically determine which precoding matrix to utilize as discussed above. Further, processor 1270 may formulate a reverse link message comprising a matrix index portion and a rank value portion.

The reverse link message may comprise various types of information regarding the communication link and/or the received data stream. The reverse link message may be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 may process the extracted message to determine which precoding matrix to use for determining the beamforming weights.

Processors 1230 and 1270 may direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 13:
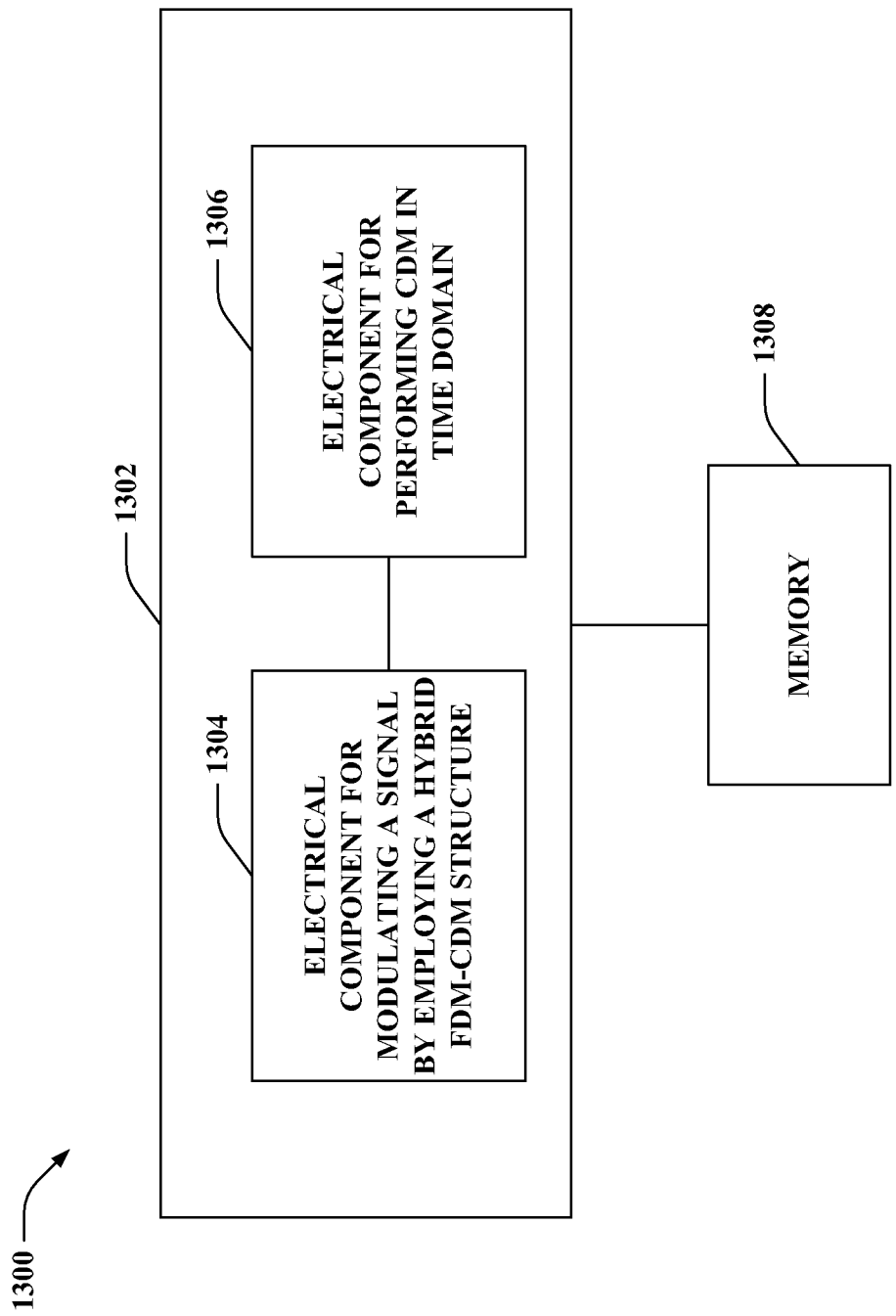
FIG. 13 is an illustration of an example system that facilitates transmission of signal that supports a hybrid FDM-CDM structure.

With reference to FIG. 13, illustrated is a system 1300 that employs a hybrid FDM-CDM structure to facilitate transmission of a single carrier based control channel. For example, system 1300 may reside at least partially within a mobile device. It is to be appreciated that system 1300 is represented as including functional blocks, which may be functional blocks that represent functions implemented by a processor, software, or combination thereof (e.g., firmware). System 1300 includes a logical grouping 1302 of electrical components that facilitate reverse link transmission. For instance, logical grouping 1302 may include an electrical component for modulating a signal by employing a hybrid FDM-CDM structure. The hybrid FDM-CDM structure provides maximum frequency diversity for a given user by permitting a user to transmit over non-contiguous tones. Further, logical grouping 1302 may comprise an electrical component for performing CDM in time domain. The CDM in time domain can allow users in neighboring cells to employ the same sequence for CDM in frequency domain. Thus, pilots of users in neighboring cells using the same sequence for CDM in frequency domain will not interfere due to the CDM performed in time domain. Additionally, system 1300 may include a memory 1308 that retains instructions for executing functions associated with electrical components 1304 and 1306. While shown as being external to memory 1308, it is to be understood that one or more of electrical components 1304 and 1306 may exist within memory 1308.

Figure 14:
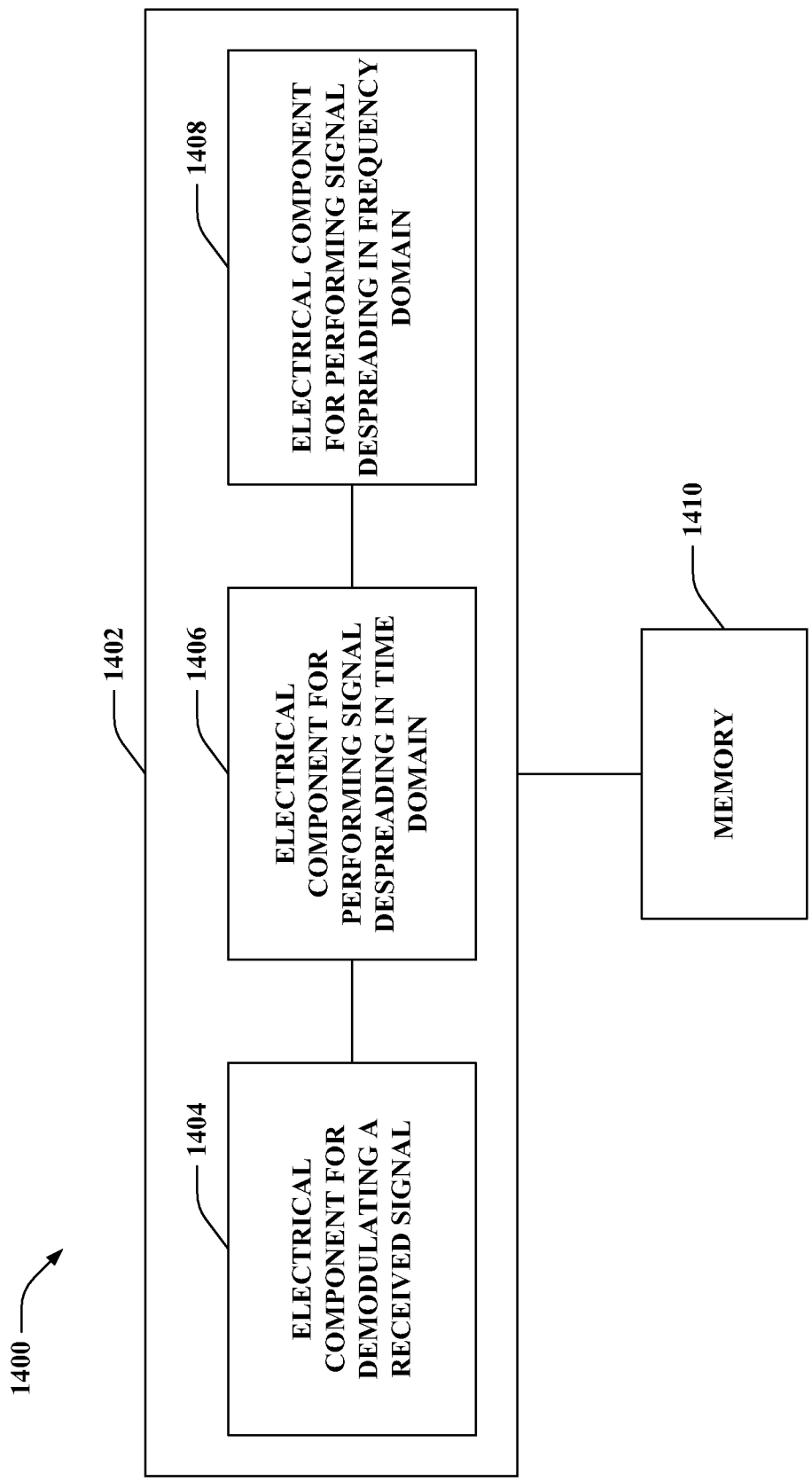
FIG. 14 is an illustration of an example system that receives a signal that supports a hybrid FDM-CDM structure.

Turning to FIG. 14, illustrated is a system 1400 that identifies signals from a specific user in a specific cell, in accordance with an aspect of the specification. System 1400 may reside within a base station, for instance. As depicted, system 1400 includes functional blocks that may represent functions implemented by a processor, software, or combination thereof (e.g., firmware). System 1400 includes a logical grouping 1402 of electrical components that can act in conjunction. Logical grouping 1402 may include an electrical component for demodulating a received signal 1404. For example, a receiver may be included in a base station to receive a message from a mobile device that transmits signals employing a hybrid FDM-CDM structure. The component 1404 can demodulate the signal to identify signals from users in a specific group. Moreover, logical grouping 1402 may include an electrical component for performing signal despreading in the time domain 1406. Further, logical grouping 1402 may comprise an electrical component for performing signal despreading in the frequency domain 1408. The despreading operation in time and frequency domain can identify a signal from a specific user in an identified group. Additionally, system 1400 may include a memory 1410 that retains instructions for executing functions associated with electrical components 1404, 1406, and 1408. While shown as being external to memory 1410, it is to be understood that electrical components 1404, 1406, and 1408 may exist within memory 1410.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An apparatus for wireless communication, comprising:
   means for spreading a signal from a first user in a first group of users across frequency, wherein signals from different users in the first group of users are code division multiplexed (CDM) in frequency domain;
   means for spreading the signal from the first user across time, wherein the signals from the different users in the first group of users are code division multiplexed in time domain; and
   means for mapping the signal from the first user to a first set of subcarriers assigned to the first group of users and corresponding to a subset of a plurality of subcarriers available for assignment to users, wherein signals from all users in the first group of users are sent on the first set of subcarriers, and wherein signals from different groups of users are frequency division multiplexed (FDM) and sent on different sets of subcarriers corresponding to different non-overlapping subsets of the plurality of subcarriers available for assignment to users.

2. The apparatus of claim 1, further comprising,
   means for mapping the signal from the first user to a set of contiguous subcarriers in a given time interval and to at least two sets of contiguous subcarriers in at least two time intervals.

3. The apparatus of claim 1, wherein the means for spreading the signal from the first user across frequency comprises
   means for spreading the signal from the first user based on one of a plurality of cyclic shifts of a spreading sequence to achieve CDM in the frequency domain.

4. The apparatus of claim 3, wherein the spreading sequence is a Zadoff-Chu sequence.

5. The apparatus of claim 1, wherein the means for spreading the signal from the first user across time comprises
   means for spreading the signal from the first user based on an orthogonal spreading code to achieve CDM in the time domain.

6. The apparatus of claim 5, wherein the orthogonal spreading code is a Hadamard code.

7. An apparatus for wireless communication, comprising:
   a generating component that spreads a signal from a first user in a first group of users across frequency, spreads the signal from the first user across time, and maps the signal from the first user to a first set of subcarriers assigned to the first group of users and corresponding to a subset of a plurality of subcarriers available for assignment to users, wherein signals from different users in the first group of users are code division multiplexed (CDM) in frequency domain and time domain, wherein signals from all users in the first group of users are sent on the first set of subcarriers, and wherein signals from different groups of users are frequency division multiplexed (FDM) and sent on different sets of subcarriers corresponding to different non-overlapping subsets of the plurality of subcarriers available for assignment to users.

8. The apparatus of claim 7, wherein the signal from the first user comprises a control signal.

9. The apparatus of claim 7, wherein the generating component spreads the signal from the first user based on one of a plurality of cyclic shifts of a spreading sequence to achieve CDM in the frequency domain.

10. The apparatus of claim 9, wherein the spreading sequence is a Zadoff-Chu sequence.

11. The apparatus of claim 7, wherein the signal from the first user comprises a reference signal.

12. The apparatus of claim 7, wherein the generating component spreads the signal from the first user based on an orthogonal spreading code in time domain to achieve CDM in the time domain.

13. The apparatus of claim 12, wherein the orthogonal spreading code is a Hadamard code.

14. The apparatus of claim 7, further comprising,
a transmitter to transmit the signal from the first user.

15. The apparatus of claim 7, wherein the generating component maps the signal from the first user to at least two sets of subcarriers in at least two time intervals to increase frequency diversity.

16. The apparatus of claim 7, wherein the signal from the first user has a single carrier waveform.

17. A method for wireless communication, comprising:
spreading a signal from a first user in a first group of users across frequency, wherein signals from different users in the first group of users are code division multiplexed (CDM) in frequency domain;
spreading the signal from the first user across time, wherein the signals from the different users in the first group of users are code division multiplexed in time domain; and
mapping the signal from the first user to a first set of subcarriers assigned to the first group of users and corresponding to a subset of a plurality of subcarriers available for assignment to users, wherein signals from all users in the first group of users are sent on the first set of subcarriers, and wherein signals from different groups of users are frequency division multiplexed (FDM) and sent on different sets of subcarriers corresponding to different non-overlapping subsets of the plurality of subcarriers available for assignment to users.

18. The method of claim 17, further comprising,
mapping the signal from the first user to a set of contiguous subcarriers in a given time interval and to at least two sets of contiguous subcarriers in at least two time intervals.

19. The method of claim 17, wherein the spreading the signal from the first user across frequency comprises
spreading the signal from the first user based on one of a plurality of cyclic shifts of a spreading sequence to achieve CDM in the frequency domain.

20. The method of claim 19, wherein the spreading sequence is a Zadoff-Chu sequence.

21. The method of claim 17, wherein the spreading the signal from the first user across time comprises
spreading the signal from the first user based on an orthogonal spreading code to achieve CDM in the time domain.

22. The method of claim 21, wherein the orthogonal spreading code is a Hadamard code.

23. The method of claim 17, further comprising,
mapping the signal from the first user to at least two sets of subcarriers in at least two time intervals to increase frequency diversity.

24. An apparatus for wireless communication, comprising:
a receiving component that obtains a received signal comprising a signal from a first user in a first group of users, the signal from the first user being spread across frequency and time and further mapped to a first set of subcarriers assigned to the first group of users and corresponding to a subset of a plurality of subcarriers available for assignment to users, wherein signals from different users in the first group of users are code division multiplexed in frequency domain and time domain, wherein signals from all users in the first group of users are sent on the first set of subcarriers, and wherein signals from different groups of users are frequency division multiplexed and sent on different sets of subcarriers corresponding to different non-overlapping subsets of the plurality of subcarriers available for assignment to users.

25. The apparatus of claim 24, further comprising,
a component that demodulates the received signal.

26. The apparatus of claim 24, further comprising,
a component that separates out the signals from the first group of users by employing a Fast Fourier Transform (FFT).

27. The apparatus of claim 24, further comprising,
a component that recovers the signal from the first user from at least two sets of subcarriers in at least two time intervals.

28. The apparatus of claim 24, further comprising,
a component that performs a despreading operation in time domain and frequency domain to recover the signal from the first user.

29. The apparatus of claim 24, further comprising,
a despreading filter that employs a despreading code, which is an inverse of a spreading code employed by the first user during transmission, to recover the signal from the first user.

30. The apparatus of claim 24, wherein the signal from the first user comprises a control signal, or a reference signal, or both the control signal and the reference signal.

31. A method for wireless communication, comprising:
obtaining a received signal comprising a signal from a first user in a first group of users, the signal from the first user being spread across frequency and time and further mapped to a first set of subcarriers assigned to the first group of users and corresponding to a subset of a plurality of subcarriers available for assignment to users, wherein signals from different users in the first group of users are code division multiplexed in frequency domain and time domain, wherein signals from all users in the first group of users are sent on the first set of subcarriers, and wherein signals from different groups of users are frequency division multiplexed and sent on different sets of subcarriers corresponding to different non-overlapping subsets of the plurality of subcarriers available for assignment to users;
demodulating the received signal to obtain a demodulated signal; and
despreading the demodulated signal in time domain and frequency domain to recover the signal from the first user.

32. The method of claim 31, further comprising,
recovering the signal from the first user from at least two sets of subcarriers in at least two time intervals.

33. The method of claim 31, further comprising,
applying a Fast Fourier Transform (FFT) to separate out the signals from the first group of users.

34. A wireless communications apparatus, comprising:
means for obtaining a received signal comprising a signal from a first user in a first group of users, the signal from the first user being spread across frequency and time and further mapped to a first set of subcarriers assigned to the first group of users and corresponding to a subset of a plurality of subcarriers available for assignment to users, wherein signals from different users in the first group of users are code division multiplexed in frequency domain and time domain, wherein signals from all users in the first group of users are sent on the first set of subcarriers, and wherein signals from different groups of users are frequency division multiplexed and sent on different sets of subcarriers corresponding to different non-overlapping subsets of the plurality of subcarriers available for assignment to users;

means for demodulating the received signal to obtain a demodulated signal; and means for despreading the demodulated signal in time domain and frequency domain to recover the signal from the first user.

35. The wireless communications apparatus of claim 34, wherein the signal from the first user has a single carrier waveform.

36. The wireless communications apparatus of claim 34, further comprising means for recovering the signal from the first user from at least two sets of subcarriers in at least two time intervals.

37. A method for wireless communication, comprising:

identifying a set of signals from users in at least one cell based in part on demodulation of a received signal, wherein a signal from each of the users is spread across frequency and time, wherein the set of signals from the users is code division multiplexed in frequency domain and time domain and is sent on a set of subcarriers corresponding to a subset of a plurality of subcarriers available for assignment to users, wherein the set of signals from the users is frequency division multiplexed with at least one other set of signals from other users in the at least one cell, and wherein the set of signals and the at least one other set of signals are sent on different sets of subcarriers corresponding to different non-overlapping subsets of the plurality of subcarriers available for assignment to users; and identifying at least one signal associated with a specific user in the at least one cell based in part on a despreading operation performed on a demodulated signal in time domain and frequency domain.

38. The method of claim 37, further comprising, applying a Fast Fourier Transform (FFT) to separate out the set of signals.

39. The method of claim 37, further comprising, employing a filtering technique for performing the despreading operation.

40. A non-transitory processor-readable medium including instructions stored thereon, comprising:

instructions for spreading a signal from a first user in a first group of users across frequency;

instructions for spreading the signal from the first user across time; and instructions for mapping the signal from the first user to a first set of subcarriers assigned to the first group of users and corresponding to a subset of a plurality of subcarriers available for assignment to users, wherein signals from different users in the first group of users are code division multiplexed in frequency domain and time domain, wherein signals from all users in the first group of users are sent on the first set of subcarriers, and wherein signals from different groups of users are frequency division multiplexed and sent on different sets of subcarriers corresponding to different non-overlapping subsets of the plurality of subcarriers available for assignment to users.

41. An apparatus for wireless communication, comprising:

a processor configured to:

spread a signal from a first user in a first group of users across frequency, spread the signal from the first user across time, and map the signal from the first user to a first set of subcarriers assigned to the first group of users and corresponding to a subset of a plurality of subcarriers available ibr assignment to users, wherein signals from different users in the first group of users are code division multiplexed in frequency domain and time domain, wherein signals from all users in the first group of users are sent on the first set of subcarriers, and wherein signals from different groups of users are frequency division multiplexed and sent on different sets of subcarriers corresponding to different non-overlapping subsets of the plurality of subcarriers available for assignment to users.

42. The apparatus of claim 41, wherein the processor is configured to spread the signal from the first user based on one of a plurality of cyclic shifts of a spreading sequence to achieve code division multiplexing in frequency domain.

43. The apparatus of claim 42, wherein the spreading sequence is a Zadoff-Chu sequence.

44. The apparatus of claim 41, wherein the processor is configured to spread the signal from the first user based on an orthogonal spreading code to achieve code division multiplexing in time domain.

45. The apparatus of claim 44, wherein the orthogonal spreading code is a Hadamard code.

46. A wireless communications apparatus, comprising:

a memory that retains instructions related to obtaining a received signal comprising a signal from a first user in a first group of users, the signal from the first user being spread across frequency and time and further mapped to a first set of subcarriers assigned to the first group of users and corresponding to a subset of a plurality of subcarriers available for assignment to users, wherein signals from different users in the first group of users are code division multiplexed in frequency domain and time domain, wherein signals from all users in the first group of users are sent on the first set of subcarriers, and wherein signals from different groups of users are frequency division multiplexed and sent on different sets of subcarriers corresponding to different non-overlapping subsets of the plurality of subcarriers available for assignment to users; and a processor coupled to the memory, configured to execute the instructions retained in the memory.

* * * * *